US006880170B1

United States Patent
Kauffman et al.

(10) Patent No.: US 6,880,170 B1
(45) Date of Patent: Apr. 12, 2005

(54) INGRESS DETECTION AND ATTENUATION (75) Inventors: Marc W. Kauffman, Fort Washington, PA (US); William H. Blum, Harleysville, PA (US); Peter Sherlock, Doylestown, PA (US); Jay Strater, Doylestown, PA (US); M. Lamine Sylla, New Britain, PA (US); Charles Eldering, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/473,871

(22) Filed: Dec. 28, 1999

Related U.S. Application Data (63) Continuation-in-part of application No. 09/074,851, filed on May 8, 1998, now Pat. No. 6,321,384, which is a continuation of application No. 08/709,456, filed on Sep. 5, 1996, now Pat. No. 5,881,362, which is a continuation of application No. 08/347,573, filed on Nov. 30, 1994, now abandoned.
(60) Provisional application No. 60/183,933, filed on Jun. 11, 1999.

(51) Int. Cl.[7] .............................................. H04N 7/173
(52) U.S. Cl. ....................... 725/125; 725/126; 725/127; 725/129
(58) Field of Search ................................. 725/105, 107, 725/111, 118, 125, 127, 124, 121, 126, 129; 348/192, 193

(56) References Cited

U.S. PATENT DOCUMENTS

| | | | |
|---|---|---|---|
| 3,619,783 A | * 11/1971 | Ritter ........................... 725/15 |
| 3,716,806 A | * 2/1973 | Zelenz ......................... 333/112 |
| 3,750,022 A | * 7/1973 | Curry et al. ................. 725/125 |
| 3,924,187 A | 12/1975 | Dormans | |
| 4,810,898 A | * 3/1989 | Rocci et al. ................. 307/115 |
| 4,928,272 A | * 5/1990 | Ohue ........................... 370/307 |
| 4,982,440 A | 1/1991 | Dufresne et al. | |
| 5,317,392 A | 5/1994 | Ishibashi et al. | |
| 5,343,158 A | 8/1994 | Gris et al. | |
| 5,361,394 A | 11/1994 | Shigihara | |
| 5,421,030 A | 5/1995 | Baran | |
| 5,425,027 A | 6/1995 | Baran | |
| 5,428,819 A | * 6/1995 | Wang et al. ................. 455/454 |
| 5,544,164 A | 8/1996 | Baran | |
| 5,606,725 A | 2/1997 | Hart | |
| 5,737,461 A | * 4/1998 | Sanders et al. ............... 385/27 |
| 5,742,713 A | 4/1998 | Sanders et al. | |
| 5,745,836 A | 4/1998 | Williams | |
| 5,819,159 A | 10/1998 | Dail | |
| 5,835,844 A | * 11/1998 | Stoneback et al. .......... 725/125 |
| 5,845,191 A | 12/1998 | Morgan | |
| 5,867,764 A | 2/1999 | Williams | |
| 5,870,395 A | 2/1999 | Baran | |
| 5,881,362 A | 3/1999 | Eldering et al. | |
| 5,893,024 A | 4/1999 | Sanders et al. | |
| 6,094,211 A | * 7/2000 | Baran et al. ................. 725/125 |
| 6,230,326 B1 | * 5/2001 | Unger et al. ................ 725/111 |
| 6,385,773 B1 | * 5/2002 | Schwartzman et al. ..... 725/124 |
| 6,567,987 B1 | * 5/2003 | Farhan et al. ............... 725/125 |
| 6,570,913 B1 | * 5/2003 | Chen .......................... 375/223 |
| 6,574,797 B1 | * 6/2003 | Naegeli et al. ............. 725/120 |

* cited by examiner

*Primary Examiner*—Chris Grant
*Assistant Examiner*—Dominic Saltarelli
(74) *Attorney, Agent, or Firm*—Robert P. Marley; Esteban A. Rockett; Wendy W. Koba (57) ABSTRACT

The present invention encompasses a method and apparatus for ingress detection and attenuation. When a determination is made that the level of ingress in a return frequency band has exceeded a predetermined threshold, the return path is attenuated or disconnected at a communications gateway device located at or substantially near the subscriber location. By disconnecting the return path or attenuating the return path signal at or near the subscriber location, ingress is reduced and locations which are the cause of severe ingress are effectively isolated. This allows for a high degree of reliability to be maintained on the return path, and insures that critical services like cable telephony can be provided.

12 Claims, 6 Drawing Sheets

INGRESS DETECTION AND ATTENUATION

CROSS-REFERENCE TO RELATED APPLICATIONS

This application is a continuation-in-part of U.S. patent application Ser. No. 09/074,851, now U.S. Pat. No. 6,321,384, having a filing date of May 8, 1998, entitled "Noise reduction in cable return", which is a continuation of Ser. No. 08/709,456 filed Aug. 5, 1996 now U.S. Pat. No. 5,881,362 which is a continuation of U.S. patent application Ser. No. 08/347,573, filed on Nov. 30, 1994, now abandoned.

This application also claims the benefit of U.S. Pat. application Ser. No. 60/183,933, entitled "Two-way cable system home ingress monitoring," filed on Jun. 11, 1999.

All of the aforementioned applications are incorporated herein by this reference, but are not admitted to be prior art.

BACKGROUND OF THE INVENTION

Cable TV systems, also known as Community Access Television (CATV) Systems, have evolved from simple broadcast systems for television services to bi-directional broadband networks which can carry voice, video and data traffic. This evolution has been accomplished in part by upgrading traditional cable networks to Hybrid Fiber Coaxial (HFC) networks which utilize fiber optic systems in conjunction with active electronics and coaxial cables to deliver broadband signals to the home. These networks also support the reception of return path signals, which are signals generated by units in or near the subscriber and which send data or voice signals from the subscriber or business location to the network through the cable system.

By providing advanced telecommunications services over HFC networks, network operators can enhance their service offerings to include voice, Internet access, and other new and unique multimedia services. Although some of these services may have minimal requirements for the transmission of data from the residence to the head-end and the network, many applications require the reliable transport of data and, in fact, need to have guaranteed and reliable bandwidth.

For example, voice communications can be carried over an HFC network based either on traditional circuit switched technology or emerging Internet Protocol (IP) standards. In either of these transport modes, an unreliable and noisy return path can cause degradation in service and even loss of an active call.

Because the configuration of the cable system is multipoint-to-point from the subscribers to the head-end, the return path has the undesirable characteristic of accumulating or "funneling" noise towards the head-end. The number of subscribers connected to the network is typically greater than 500, and many subscribers can have power dividers (splitters) installed in their homes to allow connection of multiple settops to the cable network. The result of the large number of subscribers and the multiple connections in the home is that there are a large number of points on the cable network where undesirable signals can enter the return path. The commonly used term for undesirable signals on the cable return path is ingress. Ingress is typically, but not limited to, AM shortwave broadcast signals and industrial and atmospheric noise, which can enter on the drop cable connecting the subscriber to the cable plant connection termed the tap, and via the coaxial wiring in the subscriber residence or business location. The coaxial wiring used in the home may be of low quality, and will allow ingress because of the low amount of shielding provided with respect to high quality coaxial cable which has a dense braided wire shield which provides high isolation of the center conductor from external electromagnetic fields. The coaxial wiring in the home is also typically unterminated, and can act as an antenna since currents generated on the outside of the shield can to some extent couple to the inside of the shield at the unterminated end and subsequently excite the center conductor. The accumulation of noise on the return path has adversely limited the use of the return path for many purposes.

For the foregoing reasons, there is a need for a method and apparatus to detect ingress and attenuate it at or near the subscriber location.

SUMMARY OF THE INVENTION

The present invention encompasses a method for detecting the presence of return path ingress and mitigating the return path ingress at a communications gateway located inside or near the subscriber residence or business location. The mitigation can be accomplished by either disconnecting the return path at the communications gateway or attenuating the return path signal. Detection of the ingress can occur at the head-end or may occur within the communications gateway.

The method can be practiced across an entire return frequency band or may take place in an active or inactive sub-band of the return frequency band. In the present invention, the detection of ingress can be accomplished by measuring an average return path signal power in the return frequency band and comparing the average return path signal power to a detection threshold. Based on the comparison, a determination that an ingress event is present is declared when the average power exceeds the detection threshold.

In one embodiment of the present invention, information on channel usage can be obtained and is used to distinguish active sub-bands from inactive sub-bands. The presence of ingress can be detected in either the active or inactive sub-bands and mitigated at a location near the subscriber location. The channel usage information can be retrieved from the head-end which can include network management equipment and databases which have channel information available.

Alternatively, the channel usage can be detected automatically at the communications gateway. Automatic detection can be accomplished by estimating the Power Spectrum Density (PSD) of a return path signal, correlating the PSD with a set of stored PSDs and determining the peak correlation frequency and frequency band in use.

The present invention can be realized as a communications gateway which has a network side cable connection for transmitting a return path signal onto a cable network, a subscriber side cable connection for receiving the return path signal from the residence or business, an attenuating element for reducing the power in the return path signal, and a control unit for enabling the attenuating element. In one embodiment, the communications gateway contains a switch which acts as the attenuating element. In alternate embodiments, the attenuating element is a notch filter or active electronics capable of attenuating the signal.

The present invention can also be realized as a communications gateway which contains an acquisition stage for monitoring a return path signal including an analog to digital conversion circuit for digitizing a return path monitoring signal and a processing unit for subsequently processing the return path monitoring signal and determining if the signal exceeds a predetermined threshold.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 8 in particular, the apparatus of the present invention is disclosed.

Figure 1:
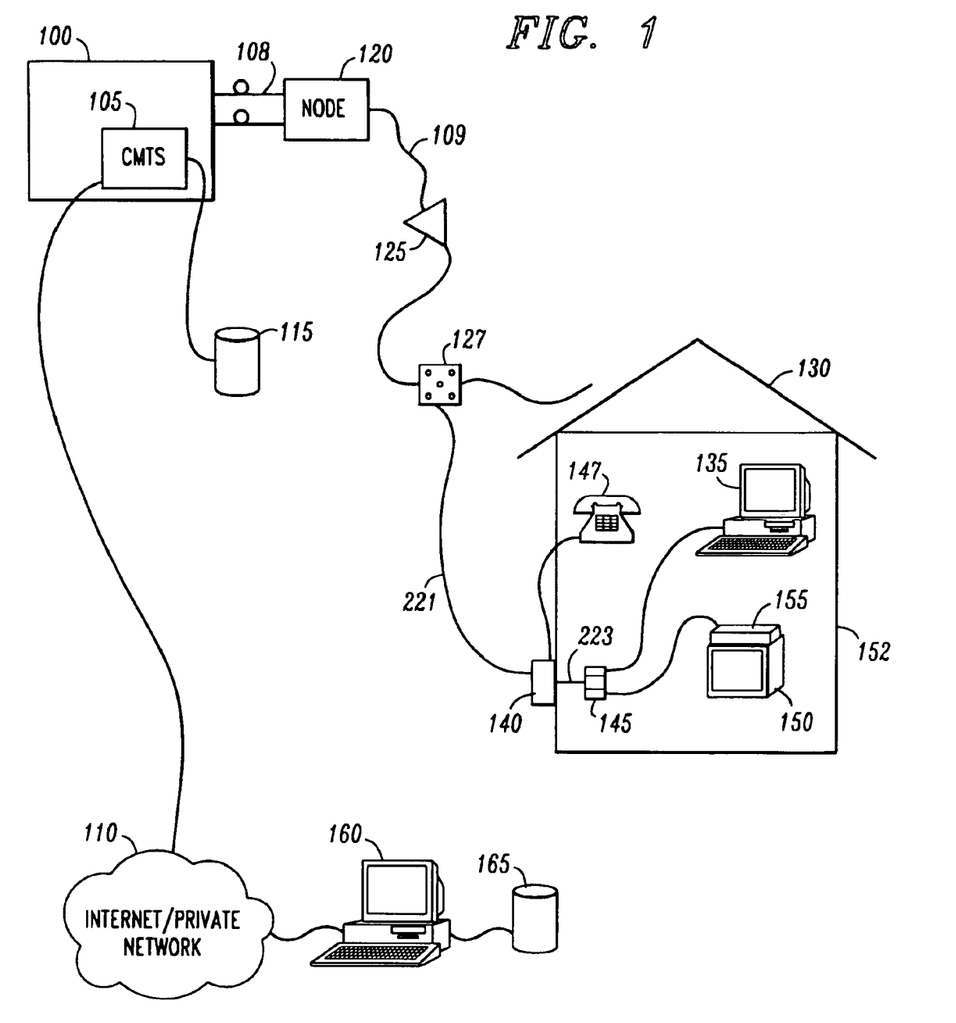
FIG. 1 illustrates a two-way cable architecture for providing telecommunications services.

FIG. 1 illustrates a bi-directional cable system comprising a head-end 100, a network interface which is represented herein by a Cable Modem Termination System (CMTS) 105 and which may be connected to a channel usage information database 115. Use of the CMTS 105 to represent the network interface is not a limitation to the present system. The present system can use any network interface for receiving upstream signals sent by a modem over the HFC network. The head-end 100 contains return path receiving equipment which can receive signals from fiber optic cables 108. In a preferred embodiment, separate cables are used for the transmission of fiber optic signals to a node 120 and for the reception of fiber optic signals transmitted from node 120 to head-end 100. Return path receiving equipment and methods of detecting return path signals at cable head-ends are well known to those skilled in the art.

From node 120 signals are transmitted over coaxial cable 109 through active amplifiers 125. Signals propagating down a coaxial cable 109 are intercepted by tap 127 which routes a portion of the signal to a Communications Gateway (CG) 140 located at or near a residence 152. A drop cable 221 is used to connect tap 127 to CG 140. In a preferred embodiment, drop cable 221 is a coaxial cable. When used herein, the term communications gateway (CG) refers to a device for transmitting and receiving data, voice or video signals over an HFC network. Alternate terminology for a communications gateway includes a Broadband Terminal Interface (BTI) or Coaxial Termination Unit (CTU). The term communications gateway is not intended to be limiting and encompasses equipment which is located on the outside of the home, in the home in a centralized location such as attic, basement or equipment closet, or in another location in the home. Businesses can also use communications gateway type devices for the transmission and reception of data, voice or video signals.

As illustrated in FIG. 1, the residence 152 can also contain a set-top box (STB) 155 which is typically connected to a television 150 and a PC 135 which can contain a cable modem. These units are typically connected through a splitter 145 to the communications gateway 140 which is coupled to the HFC network.

A telephone 147 can be supported by communications gateway 140 which provides traditional voice services by transmitting and receiving telephone signals and converting them to cable compatible signals. Telephone service supported by the CG 140 may be circuit switched or Internet Protocol (IP) based telephone service.

As shown in FIG. 1, signals from the CMTS can be routed to the Internet/private network 110. These signals can be in IP format but may also be carried as circuit switched signals. When carried as circuit switched signals, the network used is the traditional Public Switch Telecommunications Network (PSTN).

A network management system 160 may also be connected to the Internet/private network 110 and may also be able to access an ingress database 165. Ingress database 165 is used to record ingress events and can be used in conjunction with network management system 160 to establish the thresholds which indicate the presence of unacceptable levels of ingress in residence 152. The network management system 160 can also provide alarm readouts, trends or performance reports to a network operator. In one embodiment, the network management system 160 retrieves spectrum data from CG 140 and performs fault detection analysis on the retrieved spectrum data. The network management system can also store the spectrum data in a database for historical trending or other temporal analysis.

Figure 2A:
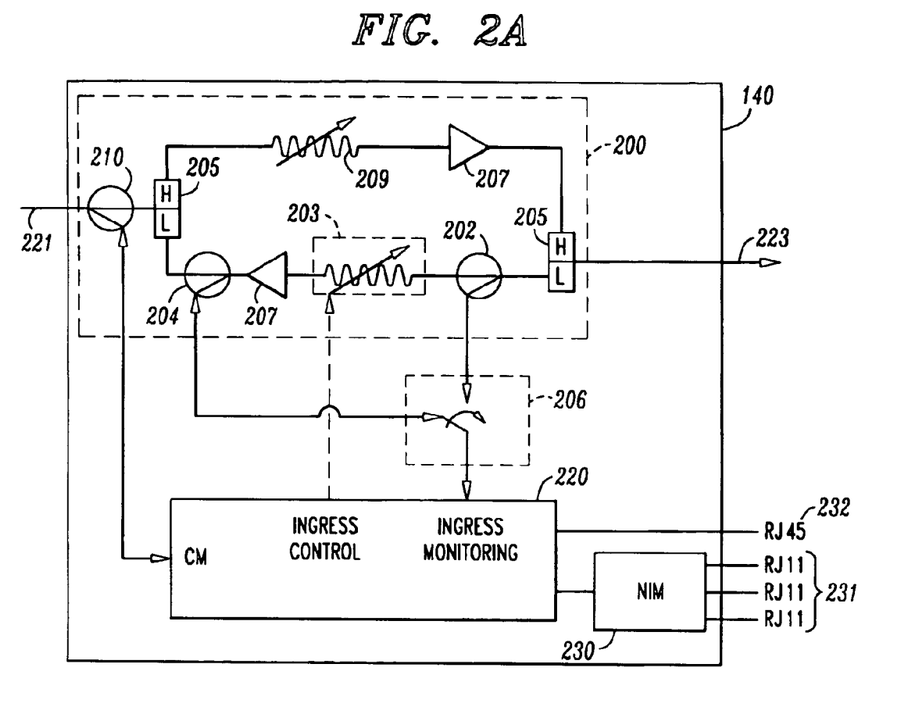
FIG. 2A illustrates a communications gateway architecture.

FIG. 2A illustrates an architecture for CG 140. In one embodiment, CG 140 contains an RF module 200 which is capable of receiving signals from the drop cable 221 connected to tap 127 and transmitting those signals to an in-home cable 223 which is typically connected to the splitter 145. A bi-directional coupler 210 is used to couple signals from drop cable 221 to a cable modem (CM) port on CG board 220. The RF module permits the transmission of downstream signals to devices in the home and at the same time allows return path signals to be transmitted from STB 155, PC 135, or other devices in the home which support bi-directional communications over the HFC network. Simultaneously, the CG 140 contains a communications gateway board (CGB) 220 which can support additional voice services and receive signals from the drop cable 221 through use of a tap 210.

The CG 140 can support telephone services through use of a Network Interface Module (NIM) 230 which supports phone services through a series of RJ11 jacks 231. In a preferred embodiment, the communications gateway also has a data interface which provides data services through RJ45 jack 232.

Referring to RF module 200 illustrated in FIG. 2A, the module contains a diplexer 205 which is used to separate out forward pass signals which are typically in the 50 to 750 MHz range of the spectrum from return path signals, which are typically in the 5 to 42 MHz portion of the spectrum. Diplexing of signals on bi-directional HFC plants is well known to those skilled in the art.

In a preferred embodiment, the RF module 200 contains a forward path attenuator 209 which is used in conjunction with an amplifier 207 to provide the appropriate levels in the forward path.

In the return path, a passive monitoring tap 202 is used to extract a portion of the return path signal arriving on in-home cable 223 and directed towards the CGB 220 where a monitoring function is performed. An attenuator/switch 203 is used in the RF module 200 to attenuate or remove return path signals when ingress from that location is determined to be unacceptable. In a preferred embodiment, an amplifier is also present in the return path allowing control of signal levels subsequent to the attenuator/switch 203.

In one embodiment, the attenuator is realized through the use of an electrically controlled variable resistor. In an alternate embodiment, active electronics configured for attenuation, such as an operational amplifier configured for less than unity gain and programmable by an external control signal, can be utilized. Electrically controlled attenuating elements are well known to those skilled in the art. Alternatively, a switch can be utilized in which case the control signal forces opening of the return path and eliminates all signals in the return band that have been generated from devices in the home and have been passed up in-home cable 223 and through diplexer 205. In one embodiment, a notch filter can be used in place of the switch to eliminate the frequencies that have a signal level above the threshold.

In one embodiment, upstream power-level equalization is performed by adjusting the upstream attenuator/switch 203. In one embodiment, the attenuator/switch 203 is initially set to a value which allows signals transmitted from devices in the residence to be received at the head-end. The following algorithm is periodically used to adjust the attenuator/switch 203. This procedure can be used both when ingress control is being performed as well as when no ingress control processes are active.

The algorithm can be simply expressed as:

Tx_Difference=(Max_Home_Tx_Level
      –Upstream_CG_Path_Loss
      –Home_Path_Loss
      –CM_Tx_Level
      +CM_Path_Loss
      +Max_Channel_Band_Delta
      –Bypass_Calc_Error_Margin);

where (Max_Home_Tx_Level–Upstream_CG_Path_Loss–Home_Path_Loss) is the maximum home device signal level received at the drop interface, (CM_Tx_Level–CM_Path_Loss) is the CG Cable Modem (CM) transmit level at the drop interface, Max_Channel$_{Band}$_Delta is the difference in CG CM channel bandwidth and the maximum CM channel bandwidth of 3.2 MHz and Bypass_Calc_Error_Margin is an offset value. Tx_Difference is the upstream attenuation value and is such that the in-home device transmitted signal power density, after losses in the home and the communication gateway 140, is received at the drop interface at a level relatively equivalent to the CG 140 CM transmit level at the drop interface. Such power level equalization limits ingress coming from the home and entering the cable plant, thus reducing any high ingress levels.

Figure 2B:
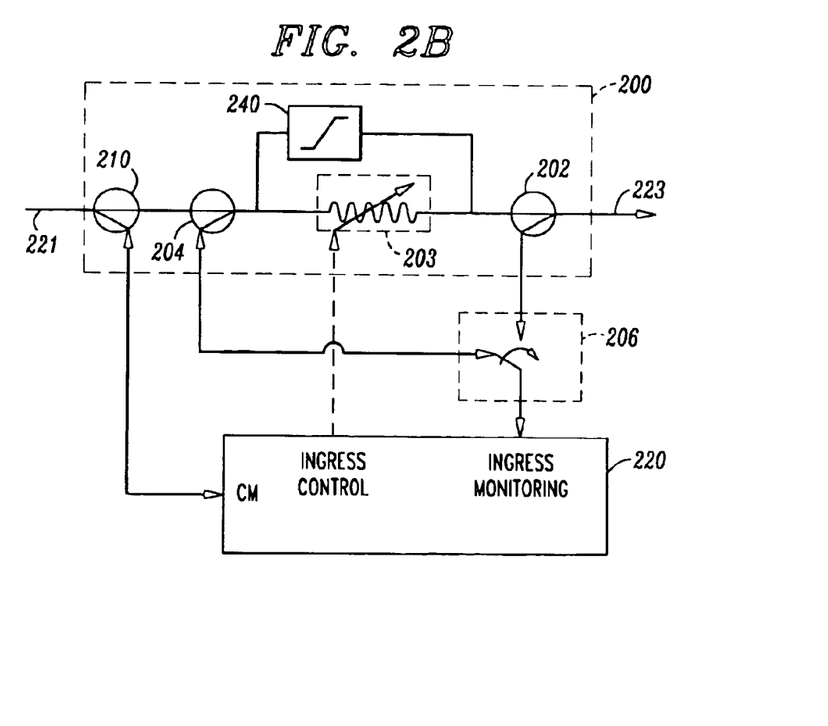
FIG. 2B illustrates a communications gateway architecture with external RF module.

FIG. 2B illustrates an embodiment in which the RF module 200 is implemented without amplifiers. In this embodiment, a bi-directional coupler 210 is present for coupling CM signals to and from drop cable 221.

In the embodiment shown in FIG. 2B, a high pass filter 240 is used to bypass downstream signals from attenuator switch 203 which is also present in RF module 200.

In one embodiment, an upstream directional coupler (DC) represented herein as passive tap 202 and a downstream directional coupler 204 are present in the RF module 200 of CG 140 to direct the downstream signal to CG board 220 for ingress monitoring purposes. In this embodiment, the passive tap 202 is used to capture ingress from the home contained in the 5–42 MHz band while the downstream DC 204 captures ingress coming from the tap within the same frequency range. In this embodiment, a switch 206 is placed at the ingress monitoring input of CG board 220 to time-sequence the outputs of DC 204 and passive tap 202. The downstream DC 204 allows detecting wideband ingress which typically enters the plant after the communication gateway 140.

Figure 3A:
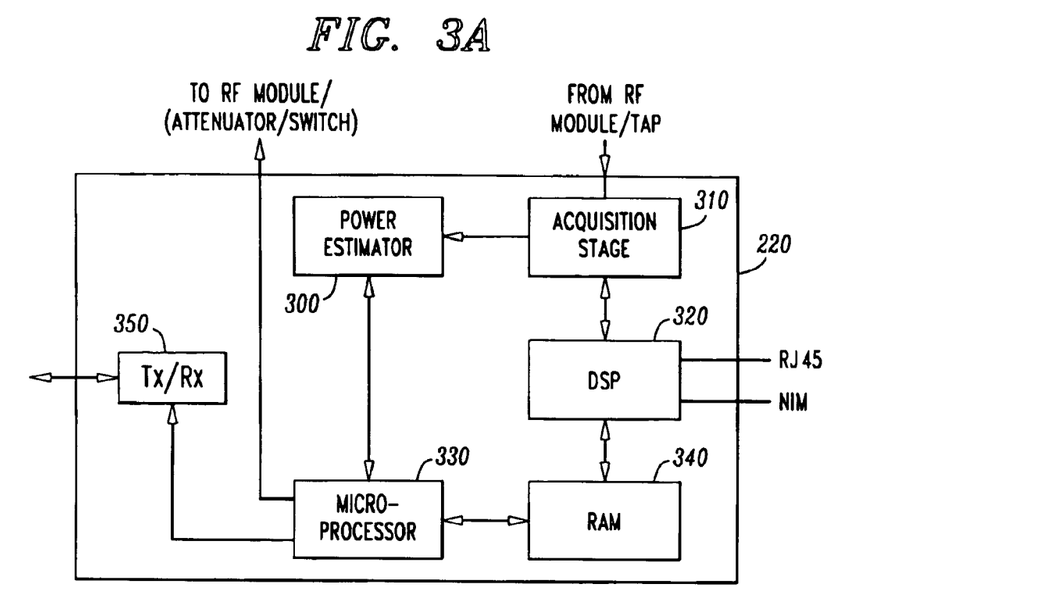
FIG. 3A illustrates a system for acquisition and processing of return path monitoring signals.

FIG. 3A illustrates one embodiment of CG board 220. In the embodiment illustrated in FIG. 3A, an acquisition stage 310 receives signals from an RF module/tap which, referring to FIGS. 2A and 2B, is generated by passive tap 202. The acquisition stage 310 is connected to a Digital Signal Processing (DSP) unit 320 which in addition to providing voice and data services can be used to process return path information to determine if ingress is present and at an unacceptable level. DSP 320 is coupled to a Random Access Memory (RAM) 340 which is further coupled to a microprocessor 330. In one embodiment, a power estimator 300 is utilized in conjunction with acquisition stage 310 to determine the presence of ingress. Microprocessor 330 utilizes information from either power estimator 300 or DSP 320 to determine that ingress is unacceptable and to generate an ingress control signal which is used to attenuate the return path signals or open the switch.

In an alternate embodiment, the return path signals are monitored at head-end 100 to determine if the ingress levels are unacceptable. If so, the CMTS 105 or other head-end equipment can issue a control signal to CG 140 for disconnection or attenuation of the return path. The head-end 100 may selectively disconnect residences in an effort to determine which home is the source of ingress, or may work in conjunction with CG 140 to determine if the return path signal from that particular residence should be disconnected or attenuated.

Referring to FIG. 3A, a transceiver 350 is utilized for communications over the HFC network. In a preferred embodiment, transceiver 350 is based on the Data Over Cable System Interface Specification DOCSIS specification and can be realized using a number of commercially available chips including those produced by the Broadcom Corporation. Transceivers for communications over bi-directional HFC networks are well known to those skilled in the art.

The DSP 320, in addition to performing voice processing for telephony services and other related tasks, can also host a digital implementation of the power estimator module. The DSP 320 can run various algorithms using assembly language, C code or other programming languages supported by the DSP.

The microprocessor 330 can direct the switch to isolate the line when the power exceeds the detection threshold either for a single event or for a predetermined number of ingress events. The microprocessor is connected to Random Access Memory (RAM) 340 which may contain data relative to the operation of the CG 140 and the in-home devices. The data may include information regarding the number of STB 155 and PCs 135 with cable modems in the home, the channels which these devices use, and the expected power levels. This information can be obtained from a network management system 160 and can be downloaded to the communications gateway via downstream channels in the cable system. When this information is present, the threshold can be calculated based on the expected transmissions from the in-home devices, rather than the worse case values discussed above. This allows a lower threshold to be established which still permits transmissions from the in-home devices to pass through the CG 140, but attenuates or disconnects the return path when ingress, as determined by the threshold set in conjunction with information from the network management system 160 and ingress database 165, is present.

Figure 3B:
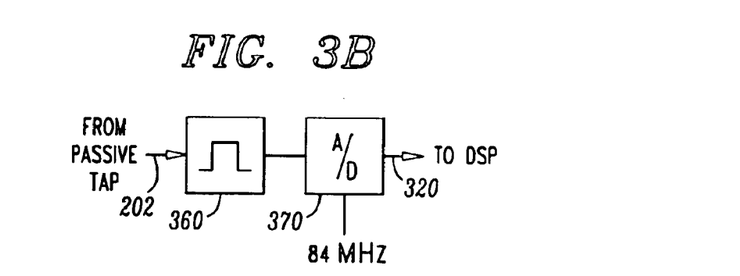
FIGS. 3B, 3C, and 3D illustrate acquisition stages.

FIG. 3B illustrates one embodiment of acquisition stage 310. In the embodiment shown, the return path signal from passive tap 202 is processed by a band-pass input filter 360 and subsequently by an analog to digital conversion stage (A/D) 370 which digitizes the signal for subsequent processing by DSP 320. In this embodiment, it is necessary to sample the return path signal at a rate sufficient to prevent undersampling. In the instance of a 5 to 42 MHz return band spectrum, sampling at 84 MHz in conjunction with band path limiting of the input signal is sufficient.

Figures 3C, 3D:
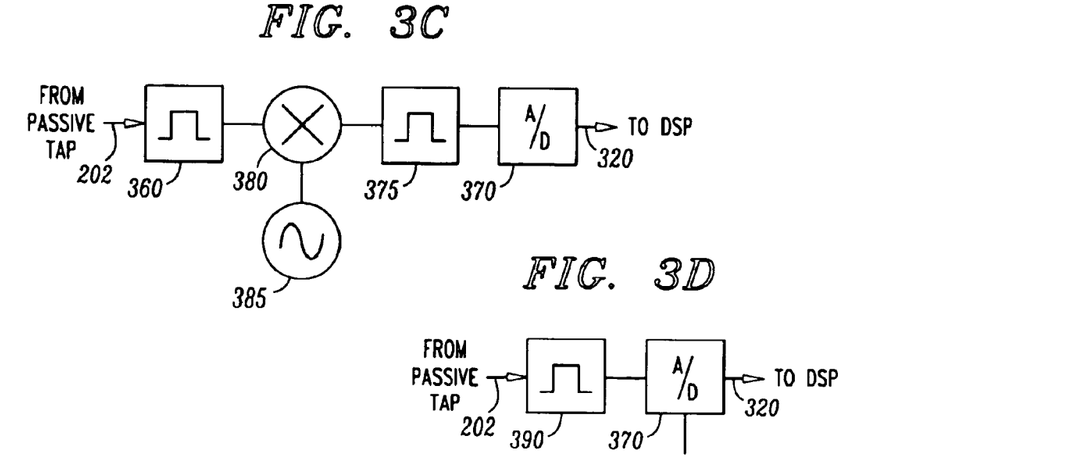

Referring to FIG. 3C, a downconversion technique is illustrated in which signals from passive tap 202 are received by a band-pass input filter 360 and subsequently downconverted using a mixer 380 in conjunction with a local oscillator 385. The downconverted signal is passed through an intermediate frequency filter 375 and to an analog to digital (A/D) converter 370. An advantage of this embodiment is that different sections of the return path spectrum can be digitized. For example, if IF filter 375 corresponds to a particular sub-band, that sub-band can be digitized and processed for subsequent determination of ingress. By varying the frequency of local oscillator 385 it is possible to select which sub-band will be examined. The advantage of this heterodyning technique is that different sub-bands can be selected for a return path monitoring based on local oscillator 385, and with the width of those sub-bands being determined by IF filter 375. In one embodiment, IF filter 375 is programmable such that the sub-bands can be varied in width. This can be useful when sub-bands vary in width from narrow bands on the order of kilohertz wide to wide return bands which may be 2 MHz or more wide.

FIG. 3D illustrates the use of a variable band-pass filter 390 in conjunction with A/D converter 370. In this embodiment, the variable band-pass filter is controlled both in frequency and width to allow direct digitization of the band of interest.

Figure 4A:
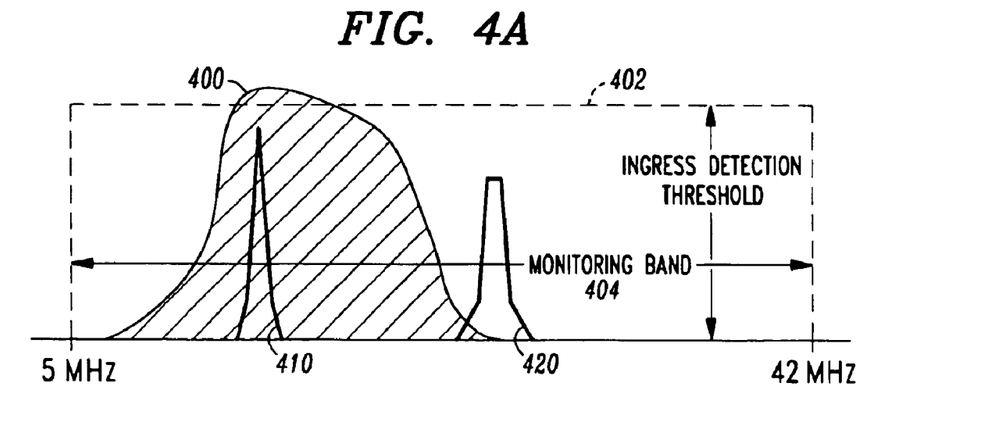
FIG. 4 illustrates full-band ingress monitoring.

FIG. 4A illustrates the monitoring of power over a contiguous section of the return band which contains several active channels. In one embodiment power estimator 300 estimates the power over a certain bandwidth $\Delta f$, determined by microprocessor 330. In one embodiment, the power is measured over the 37 MHz band. Power estimator 300 can be implemented using a nonlinear (e.g. squaring) function and a low-pass filter to average the power over a period of time T. In an analog embodiment, a diode can be used for the nonlinear function and an RC circuit can serve as an integrator. Digital implementations are also possible and are based on using an FFT to obtain the PSD of the in-home signal.

In one embodiment, the averaging time is set to a value such that $T \cdot \Delta f \gg 1$. The type of ingress to be detected depends on the choice of T, which cannot be longer than the duration of the signal to be monitored. For impulsive noise, the pulse duration is between 0.1 to 1 $\mu$sec for approximately 95% of impulse events, and between 1 to 10 $\mu$sec for the remaining impulse events. Narrowband ingress typically extends to several milliseconds and occupies a bandwidth on the order of kHz.

FIG. 4A illustrates monitoring of the return path over a monitoring band 404. In many cable systems monitoring band 404 will be 5 to 42 MHz. As shown in FIG. 4A an ingress signal 400 is along with a STB signal 410, and a CM signal 420. An ingress detection threshold 402 is established, based on the well known general characteristics of ingress, the specific characteristics of ingress for that plant, or a combination of the two. The ingress detection threshold 402 may change over time depending on the characteristics of the plant and the services in place. As an example, if more services are utilized the ingress detection threshold 402 may be lowered as compared to an initial value, since ingress may be more critical than when the services provided were minimal or at a low penetration rate.

In one embodiment ingress detection threshold 402 is established in head-end 100 and transmitted to communication gateway 140. In an alternate embodiment communication gateway 140 establishes ingress detection threshold 402 locally. As previously discussed, ingress detection threshold 402 can vary over time. Ingress database 165 can be utilized to determine an appropriate ingress detection threshold based on historical ingress data. In addition, historical ingress data can be combined with information regarding channel usage, which is available in channel usage information database 115, to determine the appropriate ingress detection threshold.

Figure 4B:
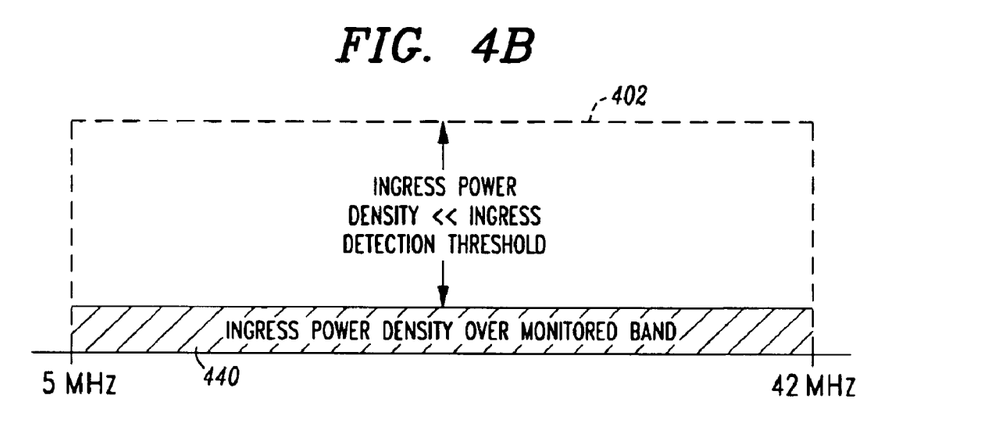

As shown in FIG. 4B, the ingress power density over the monitored band 440 can be calculated. When the ingress power density over the monitored band 440 does not exceed ingress detection threshold 402, no action is necessary. When the ingress power density over the monitored band 440 exceeds the ingress detection threshold 402, the return path signal can be attenuated, or the return path can be opened through use of a switch to eliminate the ingress.

As an example of full band monitoring, a CM can transmit up to 58 dBmV within a bandwidth of 3 MHz and an STB can transmit up to 60 dBmV within 150 kHz. If the transmit power for these devices is lowered from the maximum transmit power by 10 dB, the worst case threshold can be calculated as the estimated PSD from these data sources over the entire return path.

Figure 5A:
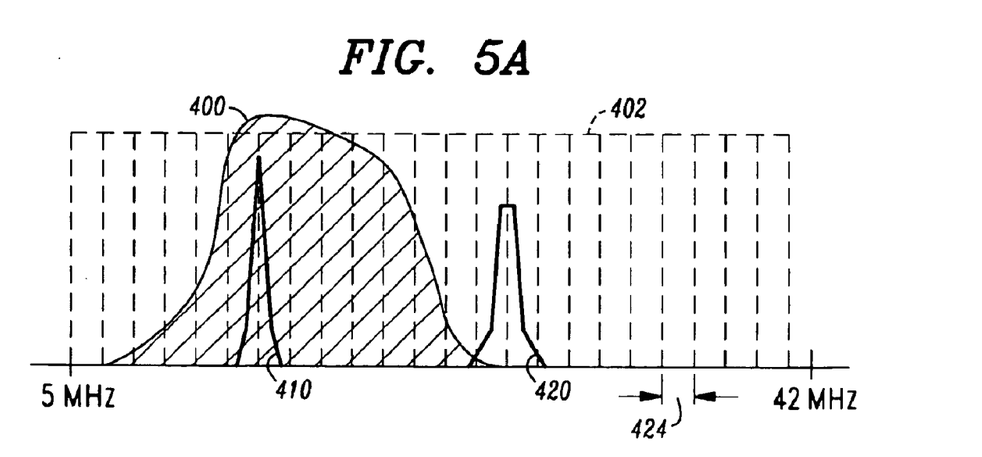
FIG. 5 illustrates sub-band ingress monitoring.
Figure 5B:
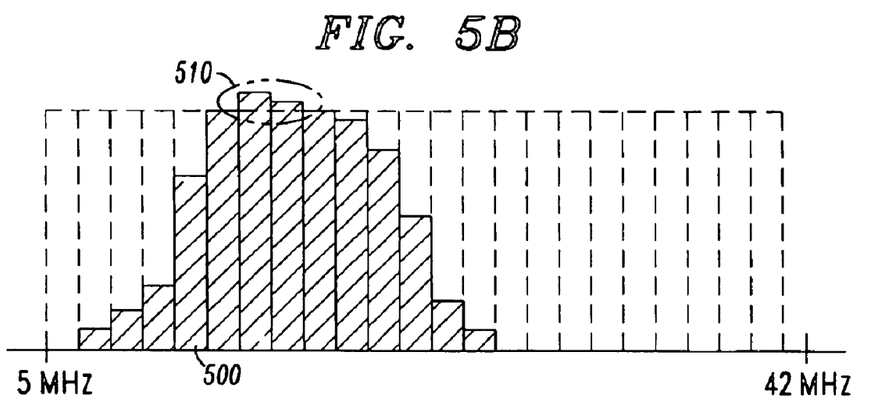

FIGS. 5A and 5B illustrate sub-band monitoring, in which ingress is monitored within monitoring bands 424. These monitoring bands can correspond to DOCSIS channels, ranging from 200 kHz to 3.2 MHz, or can be set to a bandwidth which is sufficiently wide to permit rapid acquisition of the power spectral density but narrow enough to resolve a portion of the return band.

As illustrated in FIG. 5B, the ingress power within monitoring bands 500 is measured, and when the ingress power density is greater than the ingress detection threshold, an unacceptable ingress event 510 is declared. Unacceptable ingress event 510 indicates that an unacceptable level of ingress is present in the monitoring bands 500.

Figure 6A:
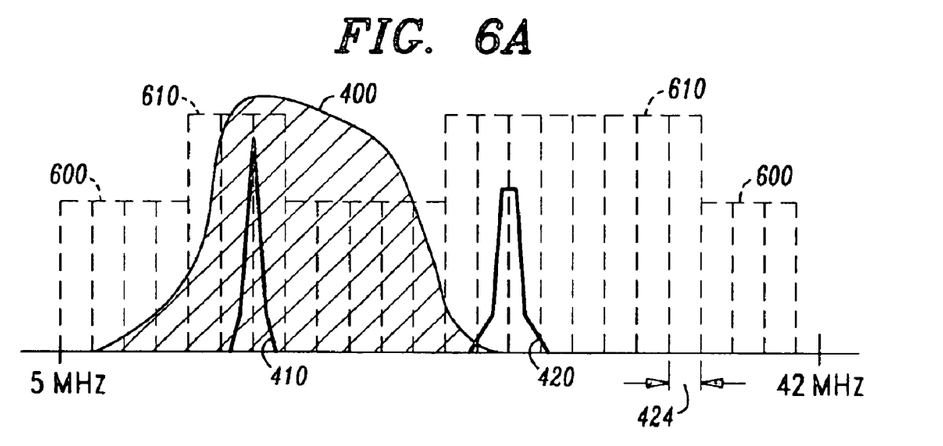
FIG. 6 illustrates sub-band ingress monitoring with channel use information.
Figure 6B:
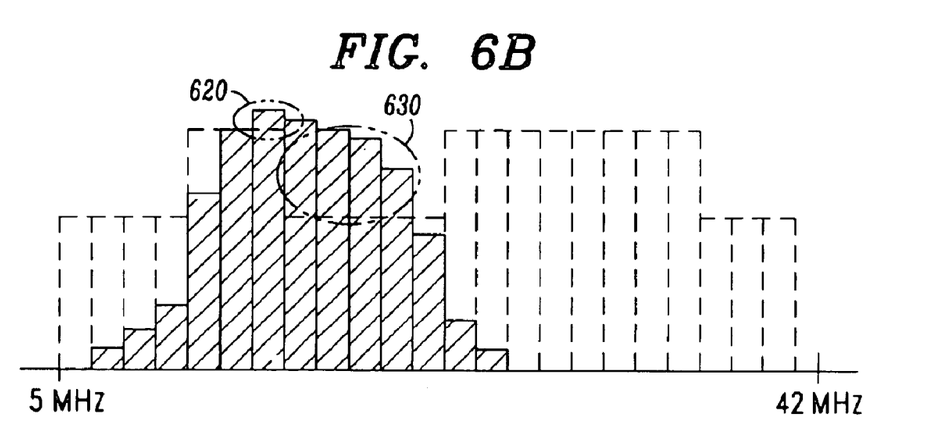

FIGS. 6A and 6B illustrate the detection of ingress with further discrimination between used and unused bands. In this embodiment used bands 610 are distinguished from unused bands 600, with unused bands 600 not containing any return path signals. The advantage of this embodiment is that an ingress detection threshold within used bands 610 can be established which is different than the ingress detection threshold within unused bands 600. As illustrated in FIG. 6B, unacceptable ingress events in used bands 620 are distinguished from unacceptable ingress events in unused bands 630. The different ingress detection thresholds are established based on the expected power levels in the used bands and the allowable ingress levels as determined with respect to the return path signal levels.

Figure 7A:
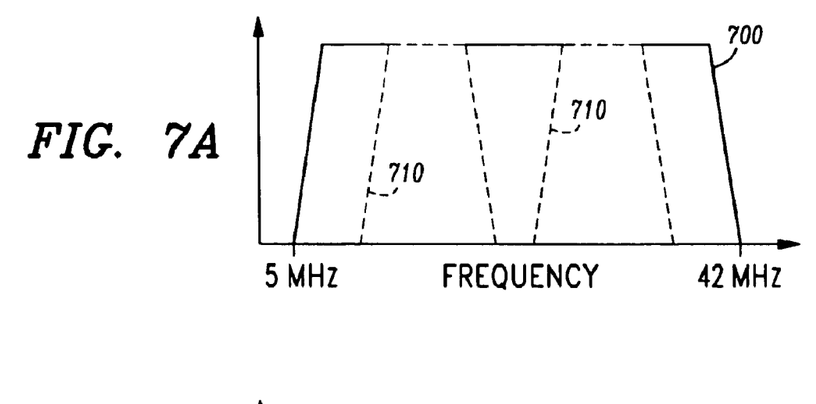
FIGS. 7A and 7B illustrate active band monitoring.

FIG. 7A illustrates the monitoring of active channels 710 in a return frequency band 700. In this embodiment, the communications gateway only monitors channels which have been identified as having return path traffic. As shown in FIG. 7A, channels may be identified as active, and the ingress monitoring techniques previously discussed used to determine if there are unacceptable levels of ingress on these channels.

Information regarding which channels are in use may be obtained from a number of sources, including the CMTS 105 at head-end 100, or by the CMTS 105 in conjunction with the channel usage information database 115. The CMTS 105 incorporates channel usage information as part of its operation in allocation of return path bandwidth using the DOCSIS protocol. Since CMTS 105 transmits downstream channel usage information to the CG 140 as part of the DOCSIS protocol, the CG can determine which return path channels are in use and monitor those channels correspondingly. Information regarding the use of return path channels by other in-home devices including STB 155 can also be transmitted to CG 140, either through DOCSIS or as part of another communication protocol.

Figure 7B:
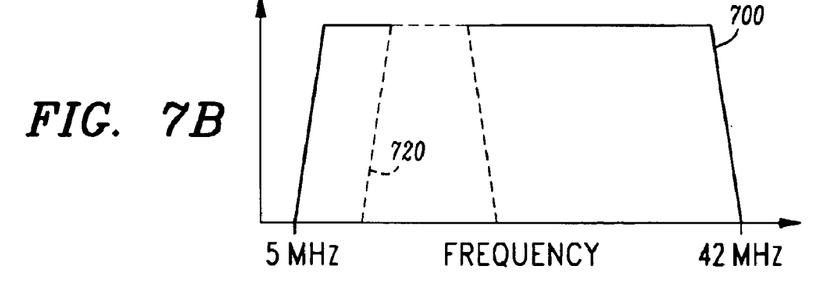

FIG. 7B illustrates the monitoring of an active CG channel 720 in the return frequency band 700. In this embodiment only the return channel being actively used by the CG 140 is monitored. Because this channel is likely to contain critical return path payloads carrying voice and data, it is important to maintain the integrity of the active CG channel 720. Information from STB 155 which is being carried on another return channel may not be as critical as the information being carried in the active CG channel 720, and by monitoring the active CG channel 720 only ingress which is present in the active CG channel 720 will result in disconnection or attenuation of the return path. This embodiment offers the advantage that ingress signals at frequencies outside of the active CG channel 720 will not result in disruption of communications in the active CG channel 720.

Figure 8:
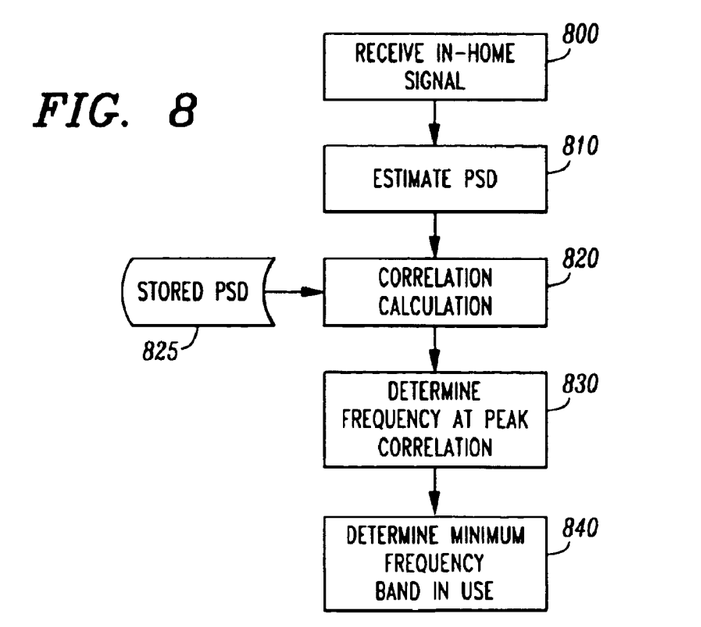
FIG. 8 illustrates a flow chart for channel usage detection.

FIG. 8 represents a flowchart for a channel recognition method which can be used to identify active channels in the return frequency band 700. The advantage of this technique is that the CG 140 can automatically identify which channels are in use in the return frequency band 700 and mark them as active channels 710.

Referring to FIG. 8 the method is performed by receiving an in-house signal 800. This can be accomplished through use of the CG 140 with return path monitoring capability as illustrated in FIG. 2A. Once the in-home signal has been received, the power spectral density (PSD) can be determined in an estimate PSD 810 step. Determination of the PSD can be accomplished through use of DSP 320 as illustrated in FIG. 3A. Upon obtaining the PSD of the received return path signal, a correlation calculation step 820 is performed using the PSD determined in step 810 and a stored PSD 825. The stored PSD 825 contains a representation of an expected return path PSD. As an example, DOCSIS based devices can utilize Quadrature Phase Shift Keying (QPSK) transmission or Quadrature Amplitude Modulation (QAM). The spectra for these transmissions, including channel width, can be known a priori and stored as part of stored PSD 825.

Once the correlation calculation step 820 is complete, a determine frequency at peak correlation step 830 is performed, followed by a determine minimum frequency band in use step 840. In the determine minimum frequency band in use step 840 the limits of the active channel 710 are determined. These limits are used in conjunction with a stored or calculated PSD mask to determine the parameters for monitoring of the return path frequency band 700.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of controlling return path ingress comprising the steps of:
    (a) automatically detecting information on channel usage to distinguish active sub-bands from inactive sub-bands by performing the steps of:
        (i) estimating a power spectrum density (PSD) of a return path signal;
        (ii) correlating the PSD with a set of stored PSDs;
        (iii) determining a frequency at peak correlation; and
        (iv) defining the frequency band of step (iii) as an active sub-band;
    (b) detecting the presence of return path ingress in the active sub-band of the return frequency band; and
    (c) mitigating the return path ingress substantially near the subscriber location.

2. The method described in claim 1 wherein the detecting of step (b) occurs at the head-end.

3. The method as described in claim 1 wherein the detecting of step (b) occurs substantially near the subscriber location.

4. The method described in claim 1 wherein the detecting of step (b) further comprises the steps of:
    (i) measuring an average return path signal power in the active sub-band of the return frequency band;
    (ii) comparing the average return path signal power to a detection threshold; and
    (iii) determining the presence of ingress in the active sub-band of the return frequency band based on the result of the comparison.

5. The method described in claim 4 further characterized in that the ingress is declared present when the average power exceeds the detection threshold.

6. The method described in claim 1 wherein the mitigating of step (c) is accomplished by attenuating the return path signal.

7. The method of claim 6 wherein the attenuating is performed based on a power-level equalization algorithm.

8. The method described in claim 1 wherein the mitigating of step (c) is accomplished by isolating the return path signal.

9. In a cable network environment having a head-end and a subscriber location with return path communication being accomplished in a return frequency band, a method of detecting and mitigating return path ingress, the method comprising the steps of:
    (a) retrieving information on channel usage to distinguish active sub-bands from inactive sub-bands, wherein channel usage is detected automatically at a location substantially near the subscriber location by:

(i) estimating a power spectrum density of a return path signal;
(ii) correlating the PSD with a set of stored PSDs;
(iii) determining a frequency at peak correlation; and
(iv) determining a frequency sub-band in use;

(b) detecting the presence of ingress in active sub-bands of the return path; and (c) mitigating the return path ingress at a location near the subscriber location.

10. The method described in claim 9 wherein the active sub-band is in use by an in-home device.

11. The method described in claim 9 wherein the active sub-band is in use by a communications gateway.

12. In a cable network environment having a head-end and a subscriber location with return path communications being accomplished in a return frequency band, a method of preventing in-home signals from entering an active sub-band of the return path at a location near the subscriber location, the method comprising the steps of:

(a) determining the active sub-band wherein the active sub-band is in use by a device located near the subscriber location, the determining using the steps of:
(i) estimating a power spectrum density of a return path signal;
(ii) correlating the PSD with a set of stored PSDs;
(iii) determining a frequency at peak correlation; and
(iv) determining a frequency sub-band in use;

(b) monitoring an in-home signal present in the active sub-band; and (c) isolating the in-home signal when the in-home signal is above a predetermined threshold.

* * * * *

UNITED STATES PATENT AND TRADEMARK OFFICE
CERTIFICATE OF CORRECTION

PATENT NO. : 6,880,170 B1
DATED : April 12, 2005
INVENTOR(S) : Marc W. Kauffman et al.

It is certified that error appears in the above-identified patent and that said Letters Patent is hereby corrected as shown below:

Column 1,
Line 8, after "return", add -- paths --.
Line 8, before "Ser.", insert -- U.S. patent application --.
Line 9, after "1996", insert -- , --.
Line 10, after "5,881,362", insert -- , --.
Line 56, after "multiple", change "settops" to -- set-tops --.

Column 4,
Lines 11-12, change "gateway type" to -- gateway-type --.

Column 5,
Line 56, change "$_{Band\_}$" to -- $\_Band\_$ --.

Column 7,
Line 44, after "385" delete "and".
Line 57, after "embodiment", add -- , --.

Column 8,
Line 13, after "signal 400 is", insert -- present --.
Line 46, after "within", insert -- a bandwidth of --.

Column 11,
Line 1, after "density", add -- (PSD) --.

Column 12,
Line 6, after "density", add -- (PSD) --.

Signed and Sealed this

Sixth Day of September, 2005

JON W. DUDAS
*Director of the United States Patent and Trademark Office*